(12) United States Patent
Gyllenspetz

(10) Patent No.: US 6,394,526 B1
(45) Date of Patent: May 28, 2002

(54) VEHICLE

(75) Inventor: Per Gyllenspetz, Göteborg (SE)

(73) Assignee: AB Volvo, Göteborg (SE)

( * ) Notice: Subject to any disclaimer, the term of this patent is extended or adjusted under 35 U.S.C. 154(b) by 0 days.

(21) Appl. No.: 09/269,452

(22) PCT Filed: Sep. 27, 1996

(86) PCT No.: PCT/SE96/01217
§ 371 (c)(1),
(2), (4) Date: Jun. 25, 1999

(87) PCT Pub. No.: WO98/13230
PCT Pub. Date: Apr. 2, 1998

(51) Int. Cl.⁷ ................................. B62D 24/14
(52) U.S. Cl. ...................... 296/70; 296/37.12
(58) Field of Search ............. 296/190.04, 190.08, 296/37.8, 37.12, 65.03, 70

(56) References Cited

U.S. PATENT DOCUMENTS

| | | | |
|---|---|---|---|
| 3,134,945 A | | 5/1964 | Wertheimer |
| 5,085,481 A | * | 2/1992 | Fluharty et al. ............ 296/37.8 |
| 5,701,754 A | * | 12/1997 | Choi et al. ............ 296/37.12 X |
| 5,823,599 A | * | 10/1998 | Gray ......................... 296/37.8 |
| 5,915,776 A | * | 6/1999 | Bieri ....................... 296/37.12 |
| 6,040,760 A | * | 3/2000 | Kataoka et al. ............ 307/10.2 |
| 6,048,020 A | * | 4/2000 | Gronowicz et al. ........... 296/70 |
| 6,095,272 A | * | 4/2000 | Takiguchi et al. ........ 296/70 X |
| 6,109,493 A | * | 8/2000 | Bieri .................... 296/37.12 X |
| 6,116,674 A | * | 9/2000 | Allison et al. ............ 296/37.8 |
| 6,130,727 A | * | 10/2000 | Toyozumi ................... 312/7.1 |
| 6,250,706 B1 | * | 6/2001 | Davis, Jr. et al. ............ 296/70 |
| 6,264,261 B1 | * | 7/2001 | Krafcik ...................... 296/37.8 |
| 6,278,676 B1 | * | 8/2001 | Anderson et al. ....... 296/37.8 X |

FOREIGN PATENT DOCUMENTS

| | | | | |
|---|---|---|---|---|
| DE | 3339613 | * | 5/1985 | ................. 296/70 |
| EP | 0 668 191 A1 | | 8/1995 | |
| GB | 2 079 694 A | | 1/1982 | |
| JP | 55-22536 | * | 5/1985 | ............. 296/37.12 |
| WO | 83/01602 A1 | | 5/1983 | |
| WO | 88/07460 A1 | | 10/1988 | |

* cited by examiner

Primary Examiner—Joseph D. Pape
Assistant Examiner—Jason Morrow
(74) Attorney, Agent, or Firm—Kilpatrick Stockton LLP

(57) ABSTRACT

Vehicles are disclosed which include a driver's seat, a passenger seat adjacent to the driver's seat, a dashboard facing the driver's seat and the passenger seat, the dashboard including an upper edge which is the lower limit of the field of vision of the driver sitting in the driver's seat, the dashboard including a cassette compartment comprising a depression in the dashboard at a location between the driver's seat and the passenger seat such that the cassette compartment is within the driver's field of view and reach while the driver is driving the vehicle, the cassette compartment having a height which is at least about 30% of the distance from the floor of the vehicle to the upper edge of the dashboard and which is adapted to accommodate a movable cassette unit.

6 Claims, 1 Drawing Sheet

VEHICLE

FIELD OF THE INVENTION

The present invention relates to a vehicle. More particularly, the present invention relates to a vehicle which, in a quick and easy manner, can be provided with a number of different accessories in the passenger compartment, such as a child seat, a hi-fi system, etc.

BACKGROUND OF THE INVENTION

Traditionally, the equipment in the passenger compartment in vehicles, and particularly passenger cars, essentially constitutes a dashboard which is situated in the front part of the passenger compartment, and which is provided with control devices and switches. A driver's seat and a passenger seat are thus situated behind the dashboard. Furthermore, the passenger compartment also includes a back seat for passengers, which is located in the rear part of the compartment.

Increasingly, extensive demands are being made on today's cars to provide for all-around and safe utilization of the available space in the car. The car must therefore be capable of readily adapting to different utility requirements, such as the transportation of small children or of a bulky load. In order to be so adaptable, the utilization of different accessories is often required, such as, for example, a safety-tested child seat. According to known techniques, the child seat is either placed in the back seat, where the child seat is turned forwards or backwards, in the front passenger seat, or in the dashboard, where the child seat is placed immediately in front of the passenger seat in the front of the vehicle. A disadvantage with these child seat arrangements is that the driver, when he/she is travelling alone with the child, has an insufficient opportunity to watch over the child during driving. Also, under these circumstances there is no possibility for the driver to reach the child, at least not without the driver having to stretch him-/herself, and accordingly lose concentration as regards movement of the vehicle. A further disadvantage is that no passenger (apart from the child itself) can use the passenger seat in the front, since the child seat is situated in the passenger seat or in the dashboard immediately in front of the passenger seat.

Furthermore, rapid progress in the field of information technology has made it possible to use advanced office equipment in vehicles, such as a fax machine, a computer with a word processor, a telephone modem, etc. Another example of advantageous accessories for use in a vehicle is equipment for the cold storage and heating of foodstuffs. At the present time, however, there is however no available area in the car which is easily accessible from the driver's seat and which is intended for such accessories, particularly since such accessories are generally too bulky to be accommodated in, for example, the space which is normally intended for a normal-sized car stereo system.

Present day car dashboards are in most cases provided with a so-called central bracket which, as the term implies, is situated in the central part of the dashboard. Traditionally, the central bracket contains a hi-fi system, control devices, exhaust nozzles for the car air-conditioning system, an outlet for a cigarette lighter, and smaller storage compartments. Accordingly, the space that is occupied by the central bracket is to a great extent traditionally intended for exactly these functions, which is partly due to the fact that the bracket is situated within the driver's (peripheral) field of view and reach during driving.

Thus, as a result of the above-described, strong traditional manner of equipping the passenger compartment in the today's vehicles, especially passenger cars, the possibilities for all-round utilization of the accessible areas in the car are limited. Instead of using the passenger compartment to the greatest possible extent for those individuals and objects that the user wishes to transport in the car, there is thus a tendency towards retaining, in a routine way, an out-of-date approach, such as arranging the hi-fi system, the controls, and the exhaust nozzles for the car air-conditioning system in the central part of the dashboard, even though this is neither technically nor ergonomically necessary.

SUMMARY OF THE INVENTION

In accordance with the present invention, these and other objects have now been realized by the invention of a vehicle comprising a vehicle floor, a driver's seat, a passenger's seat adjacent to the driver's seat, and a dashboard facing the driver's seat and the passenger's seat, the dashboard including an upper edge comprising the lower limit of the field of vision of a driver sitting in the driver's seat, the dashboard including a cassette compartment comprising a depression in the dashboard at a location between the driver's seat and the passenger seat whereby the cassette compartment is within the driver's full field of view and reach while the driver is driving the vehicle, the cassette compartment having a predetermined height comprising at least about 30% of the distance from the vehicle floor to the upper edge of the dashboard and being adapted to accommodate a removable cassette unit. In a preferred embodiment, the cassette compartment includes connection means for connecting the cassette compartment to a control function for the vehicle. Preferably, the control function can be a power supply, ventilation means, climate control means, antenna means, and a sensor signal for an airbag in the vehicle.

In accordance with one embodiment of the vehicle of the present invention, the cassette In accordance with one embodiment of the vehicle of the present invention, the cassette compartment is adapted to be used as a storage space when not accommodating a removable cassette unit.

In accordance with another embodiment of the vehicle of the present invention, the predetermined height of the cassette compartment comprises at least about 50% of the distance from the vehicle floor to the upper edge of the dashboard. In a preferred embodiment, the predetermined height of the cassette compartment comprises the distance from the vehicle floor to the upper edge of the dashboard.

In accordance with another embodiment of the present invention, the vehicle is combined with a removable cassette unit comprising a child seat. In another embodiment, the vehicle is combined with a removable cassette unit comprising a hi-fi system. The removable cassette unit can also comprise office equipment, such as a fax machine or a document compartment, a food processing unit, such as a cold storage means or heating means, a dog basket, or a storage compartment for carrying a load, including securing means for securing the load.

The present invention solves the above-mentioned problems by replacing the traditional positioning of control devices in the central part of the dashboard with a large cassette compartment and a number of replaceable cassette units which fit within the cassette compartment, the cassette units having different functions between them, such as a child seat, a dog basket, office equipment, a hi-fi system, a refrigerator, a microwave oven, or storage space. In this manner, better utilization of the valuable space in the car that is situated within the driver's field of view and reach during driving is achieved, and a very safe positioning of children or a load is effected from a collision-safety point of view. According to the present invention, this area is utilized for functions relating to transport and accessories which are essential for the individual, instead of this area, as is traditional, being occupied by bulky control and ventilation nozzles, which can be advantageously rearranged to a safer control environment around the steering wheel and main instrumentation.

More specifically, the present invention relates to a vehicle which comprises a driver's seat, a passenger seat which is situated at the side of the driver's seat, and a dashboard which is situated in front of the driver's seat and the passenger seat, wherein the upper edge of the dashboard constitutes the lower limitation of the driver's forward field of view. In particular, the present invention relates to a hole-shaped cassette compartment which is situated in the central part of the dashboard in front of, and between, the driver's seat and the passenger seat and within the driver's field of view and reach during driving, the cassette compartment being adapted for accommodating a cassette unit having a predetermined function, and wherein the height of the cassette compartment constitutes at least about 30% of the vertical distance from the vehicle floor up to the lower limitation of the driver's forward field of view.

In an advantageous embodiment, the cassette compartment is provided with connection outlets, such as outlets for a power supply, ventilation, climate control, an antenna and a sensor signal for airbag. Advantageously, one cassette unit may constitute a child seat turned backwards. Other cassette units may constitute, for example, office equipment, a hi-fi system, a dog basket, Storage space or means for cold storage and/or heating of foodstuffs.

The present invention will be described in the following detailed description with reference to the annexed drawings, in which.

DETAILED DESCRIPTION

Figure 1:
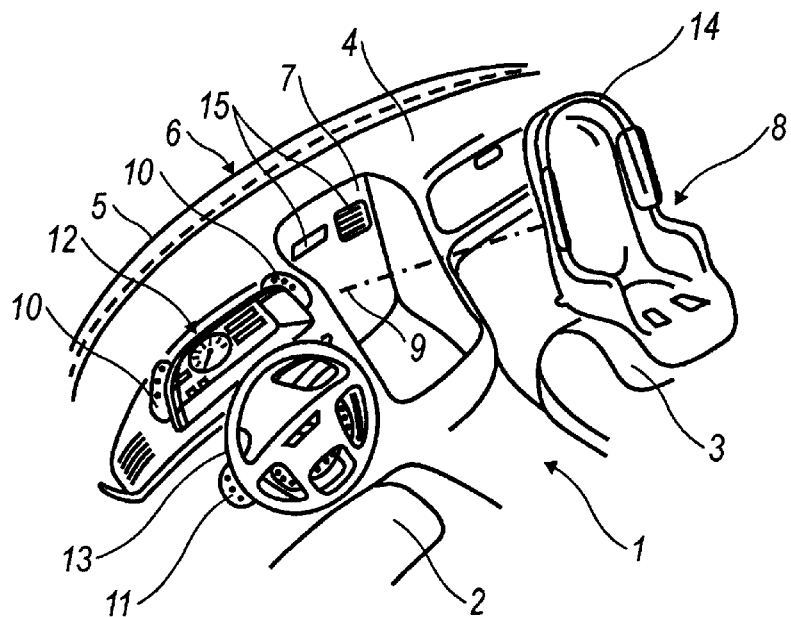
FIG. 1 is a rear, partially cut-away, perspective view of the passenger compartment in a vehicle according to the present invention.

Referring to FIG. 1, reference numeral 1 refers generally to the front part of the passenger compartment in a passenger car according to the present invention. In a known manner, the passenger compartment 1 contains a driver's seat 2 and a passenger seat 3, which is situated at the side of the driver's seat 2. A dashboard 4 is situated in front of the driver's seat 2 and passenger seat 3, wherein the upper edge 5 of the dashboard 4 constitutes the lower limitation of the driver's forward field of view. In the preferred embodiment, a hole-shaped cassette compartment 7 is integrally arranged in the central part 6 of the dashboard 4 in front of, and between, the driver's seat 2 and the passenger seat 3.

The cassette compartment 7 is adapted for accommodating a cassette unit 8 which, in the embodiment shown in FIG. 1, is a child seat 14 turned backwards, the cassette unit 8 being shown in an exploded view with a fictitious connection line 9 towards the centrally situated cassette compartment 7. In a manner which will be described below, other predetermined accessory functions can also be accommodated in exchangeable cassette units 8.

Due to its being positioned in the central part 6 of the dashboard 4, the cassette unit 8 that is accommodated in the cassette compartment 7 is situated within the driver's field of view and reach during driving. In the example shown in FIG. 1, the cassette unit 8 constitutes a child seat 14, and this arrangement thus results in a considerable advantage from a driving-safety point of view, as compared with known arrangements of child seats. This is due to the fact that the child is situated within the driver's peripheral field of view during driving and can be reached quickly, without the driver having to stretch him-/herself or having to turn his/her head. Thus, the driver can concentrate on the surrounding traffic conditions, without this necessarily resolution in the driver losing his/her control of the child. Also, the central positioning of the child seat 14, immediately behind the cowl wall of the car, is very advantageous from a collision-safety point of view. During collisions from any given sector around the car, the child seat 14 is thus well protected. An additional advantage is that the passenger seat 3, due to the child seat being centrally situated, will be free for a passenger to use, which is not the case as regards known child seats, which, for example, are mounted immediately in front of the glove compartment, and thus occupy the entire passenger seat.

As is clearly apparent from FIG. 1, the cassette compartment 7 and the associated cassette units 8 according to the present invention occupy a considerably larger area of the dashboard 4 than that occupied by the largest, presently available, car hi-fi systems. More specifically, the height of the cassette compartment constitutes at least about 30%, preferably about 50%, of the vertical distance from the vehicle floor up to the lower limitation of the driver's forward field of view. Maximally, the cassette compartment extends from the vehicle floor up to the lower limitation of the driver's forward field of view. This large area is absolutely necessary for the compartment to be capable of accommodating accessories, such as a child seat, etc.

In a vehicle according to the present invention, the control devices and the like, which in conventional Vehicles are situated in connection with the central bracket in the dashboard, are instead situated around the steering wheel and the main instrumentation. Thus, a safer environment is also provided for these control devices. FIG. 1 shows examples of the control devices 10 and 11, being schematically positioned around the steering wheel 12 and the main instrumentation 13 of the car. Advantageously, the parking brake and the gear selector (not shown) also can be placed in this area. In order to provide sufficient space for a cassette unit 8 in the form of, for example, a child seat, a vehicle according to the present invention can advantageously be constructed slightly wider than normally.

Furthermore, the cassette compartment 7 is provided with connection outlets 15, such as outlets for a power supply, ventilation, climate control, an antenna and a sensor signal for an airbag. In this regard, the cassette units are provided with corresponding connectors 16 or connection channels (not shown) for connection to the outlets 15. By means of the connection outlets 15, for example, a child seat may advantageously be provided with ventilation, speakers and an airbag.

Figures 5, 6:
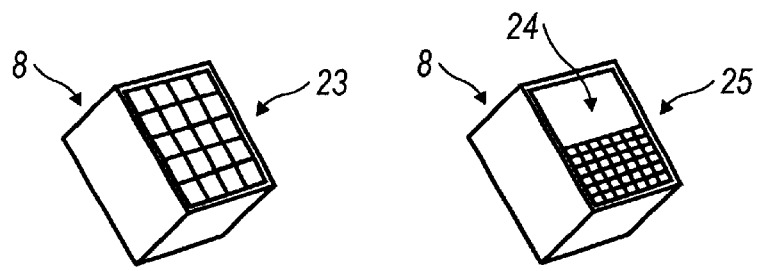
FIG. 5 is a front perspective view of a cassette unit comprising a dog basket for use in the present invention.
FIG. 6 is a front perspective view of a cassette unit comprising a storage space.

Preferably, the cassette unit 7 is constructed such that, when the cassette unit 8 is removed it can serve as storage space for, for example, a handbag, a briefcase or a shopping bag. Apart from the fact that the positioning immediately at the side of the driver's seat makes it easier to put down the and pick up the case/bag, as compared with the usual positioning in the back seat, the positioning is also safer, due to the fact there is no risk of loose objects flying forward in the event of a collision. According to the present invention, a cassette unit 8 can also be specially constructed as a storage compartment 24 as illustrated in FIG. 6 and provided with equipment for securing the load, such equipment for example being in the form of belts or a load securing net 25.

Figures 2, 3, 4:
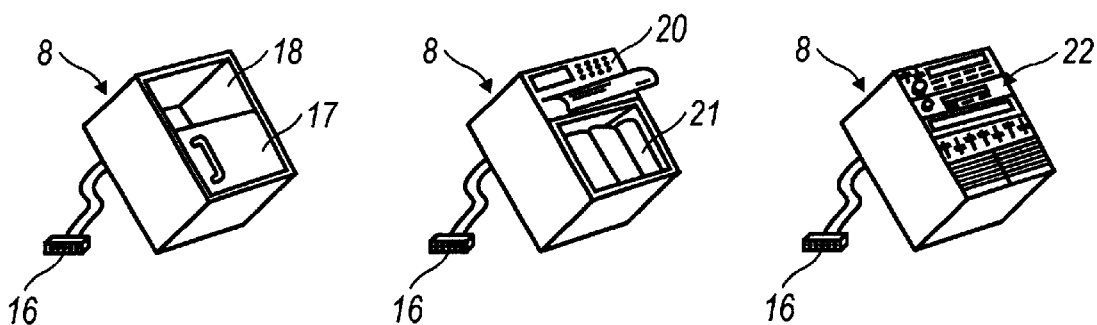
FIG. 2 is a front, perspective view of a cassette unit comprising a cold storage compartment for foodstuffs for use in the present invention.
FIG. 3 is a front, perspective view of a cassette unit comprising a fax machine and document compartments for use in the present invention.
FIG. 4 is a front, perspective view of a cassette unit comprising a hi-fi system for use in the present invention.

As previously mentioned, the cassette units 8 can be constructed such that they fulfill predetermined accessory functions. In this regard, FIG. 2 shows a cassette unit 8 that is provided with a cold storage compartment 17 for foodstuffs combined with a dry storage compartment 18. Furthermore, the cassette unit 8 is provided with a connector 16 for a power supply. Also, the cold storage compartment may advantageously be combined with a heating device for foodstuffs, such as a microwave oven (not shown). Of course, the cassette unit 8 can also consist of only one single microwave oven, alternatively in combination with a storage compartment 18. The storage compartment 18 can advantageously be constructed to accommodate sizeable beverage containers, such as, for example, 1.5 liter soft drink bottles.

FIG. 3 shows a cassette unit 8 provided with office equipment in the form of a fax machine 20 and document compartments 21. The cassette unit 8 can also be provided with other office equipment, such as, for example, a computer terminal with a screen unit, and a telephone.

FIG. 4 shows a cassette unit 8 provided with a large hi-fi system 22 which, for example, comprises a CD-changer and so-called sub-woofer speakers.

FIG. 5 shows a cassette unit 8 provided with a dog basket 23 for smaller and medium-sized dogs. The dog basket 23 is perferably provided with means for leashing the dog. In this manner, a way of transporting the dog is obtained which is advantageous from a traffic- and collision-safety point of view, wherein the dog also can be guarded, during driving.

The present invention is not limited to the embodiment which is described above and shown in the drawing, but may be varied freely within the scope of the appended claims. For example, it is not necessary for the cassette unit 7 to be integrally arranged in the dashboard 4, but it may instead constitute a free space between, and in front of, the driver's seat 2 and the passenger seat 3.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A vehicle comprising a vehicle floor, a driver's seat, a passenger's seat adjacent to said driver's seat, and a dashboard facing said driver's seat and said passenger's seat, said dashboard including an upper edge comprising the lower limit of the field of vision of a driver sitting in said driver's seat, said dashboard including a cassette compartment comprising a depression in said dashboard at a location between said driver's seat and said passenger's seat whereby said cassette compartment is within said driver's full field of view and reach while said driver is driving said vehicle, said cassette compartment having a predetermined height comprising at least about 30% of the distance from said vehicle floor to said upper edge of said dashboard and being adapted to accommodate a removable cassette unit, said removable cassette unit comprising a child seat.

2. A vehicle comprising a vehicle floor, a driver's seat, a passenger's seat adjacent to said driver's seat, and a dashboard facing said driver's seat and said passenger's seat, said dashboard including an upper edge comprising the lower limit of the field of vision of a driver sitting in said driver's seat, said dashboard including a cassette compartment comprising a depression in said dashboard at a location between said driver's seat and said passenger's seat whereby said cassette compartment is within said driver's full field of view and reach while said driver is driving said vehicle, said cassette compartment having a predetermined height comprising at least about 30% of the distance from said vehicle floor to said upper edge of said dashboard and being adapted to accommodate a removable cassette unit, said removable cassette unit comprising office equipment selected from the group consisting of a fax machine and a document compartment.

3. A vehicle comprising a vehicle floor, a driver's seat, a passenger's seat adjacent to said driver's seat, and a dashboard facing said driver's seat and said passenger's seat, said dashboard including an upper edge comprising the lower limit of the field of vision of a driver sitting in said driver's seat, said dashboard including a cassette compartment comprising a depression in said dashboard at a location between said driver's seat and said passenger's seat whereby said cassette compartment is within said driver's full field of view and reach while said driver is driving said vehicle, said cassette compartment having a predetermined height comprising at least about 30% of the distance from said vehicle floor to said upper edge of said dashboard and being adapted to accommodate a removable cassette unit, said removable cassette unit comprising a storage compartment for carrying a load and a means for securing said load.

4. A vehicle comprising a vehicle floor, a driver's seat, a passenger's seat adjacent to said driver's seat, and a dashboard facing said driver's seat and said passenger's seat, said dashboard including an upper edge comprising the lower limit of the field of vision of a driver sitting in said driver's seat, said dashboard including a cassette compartment comprising a depression in said dashboard at a location between said driver's seat and said passenger's seat whereby said cassette compartment is within said driver's full field of view and reach while said driver is driving said vehicle, said cassette compartment having a predetermined height comprising at least about 30% of the distance from said vehicle floor to said upper edge of said dashboard and being adapted to accommodate a removable cassette unit, said removable cassette unit comprising a food processing unit and a power connector for providing power to the processing unit.

5. The vehicle of claim 4 wherein said food processing unit further comprises cold storage means.

6. The vehicle of claim 4 wherein said food processing unit further comprises heating means.

* * * * *